(12) United States Patent
Lowth et al.

(10) Patent No.: US 9,844,897 B2
(45) Date of Patent: Dec. 19, 2017

(54) METHOD AND APPARATUS FOR SUPPORTING BLADES

(71) Applicant: ROLLS-ROYCE PLC, London (GB)

(72) Inventors: Stewart Lowth, Nottingham (GB); Kiran Kolluru, Nottingham (GB); Dragos Aurelian Axinte, Nottingham (GB); Mark Hugh Raffles, Nottingham (GB)

(73) Assignee: ROLLS-ROYCE plc, London (GB)

( * ) Notice: Subject to any disclaimer, the term of this patent is extended or adjusted under 35 U.S.C. 154(b) by 799 days.

(21) Appl. No.: 14/498,203

(22) Filed: Sep. 26, 2014

(65) Prior Publication Data

US 2015/0343674 A1 Dec. 3, 2015

(30) Foreign Application Priority Data

Oct. 23, 2013 (GB) .................................. 1318694.5

(51) Int. Cl.
  *B29C 39/26* (2006.01)
  *B29C 39/10* (2006.01)
  (Continued)

(52) U.S. Cl.
  CPC .............. *B29C 39/26* (2013.01); *B23Q 3/063* (2013.01); *B23Q 3/086* (2013.01); *B29C 39/10* (2013.01); *B29C 39/38* (2013.01); *F01D 5/005* (2013.01); *F01D 5/3061* (2013.01); *F01D 25/285* (2013.01); *B29K 2063/00* (2013.01); *B29K 2091/00* (2013.01); *B29K 2905/00* (2013.01);
  (Continued)

(58) Field of Classification Search
  CPC ......... B23Q 3/063; B23Q 3/086; F01D 5/005; B29C 39/26
  See application file for complete search history.

(56) References Cited

U.S. PATENT DOCUMENTS 2,612,082 A * 9/1952 Angell ................... B23Q 3/063
164/207
3,760,864 A * 9/1973 Kirby, Jr. ............... B22D 27/04
164/126

(Continued)

FOREIGN PATENT DOCUMENTS

DE 102004056142 A1 6/2006
EP 0881030 A1 12/1998
(Continued)

OTHER PUBLICATIONS

Vantico, Araldite Spec Sheet, one part, heat curable epoxy. Dec. 2000, 4 Pages.*
(Continued)

*Primary Examiner* — Jacob Cigna
(74) *Attorney, Agent, or Firm* — Oliff PLC

(57) ABSTRACT

A method of supporting a cantilevered component mounted to a hub by locating a cassette in proximity to the cantilevered component, the cassette defining a volume for filling with an encapsulant; filling the volume with an encapsulant material; and causing the encapsulant to solidify to the cantilevered component to support the cantilevered component. The cantilevered component is preferably a blade on a bladed disc and the encapsulant provides support to change the vibration response of the blade during a subsequent machining step.

17 Claims, 6 Drawing Sheets

(51) Int. Cl.
  *B29C 39/38* (2006.01)
  *B23Q 3/06* (2006.01)
  *B23Q 3/08* (2006.01)
  *F01D 5/00* (2006.01)
  *F01D 5/30* (2006.01)
  *F01D 25/28* (2006.01)
  *B29K 63/00* (2006.01)
  *B29K 91/00* (2006.01)
  *B29L 31/08* (2006.01)

(52) U.S. Cl.
  CPC ....... *B29L 2031/08* (2013.01); *F05D 2230/80* (2013.01)

(56) References Cited

U.S. PATENT DOCUMENTS

| | | | |
|---|---|---|---|
| 4,822,013 A | 4/1989 | Johnson | |
| 5,013,014 A * | 5/1991 | Mushardt | B23Q 3/063 269/7 |
| 5,112,389 A * | 5/1992 | Pelz | B23Q 3/063 29/403.4 |
| 5,217,673 A * | 6/1993 | Pelz | B23Q 3/063 266/205 |
| 5,867,885 A | 2/1999 | Bales et al. | |
| 8,341,841 B2 * | 1/2013 | Fessler-Knobel | B23Q 3/063 29/281.1 |
| 8,375,583 B2 * | 2/2013 | Berlanger | B23C 3/18 29/418 |
| 2005/0205644 A1 | 9/2005 | Meier | |
| 2005/0214505 A1 * | 9/2005 | Deakin | C23C 4/02 428/116 |
| 2007/0081901 A1 * | 4/2007 | Wagner | F01D 5/16 416/241 R |
| 2010/0074704 A1 * | 3/2010 | Rozic | B23C 3/18 409/141 |
| 2010/0212158 A1 * | 8/2010 | Heinrich | B23Q 3/086 29/889.23 |
| 2015/0298298 A1 * | 10/2015 | Geng | B23Q 3/06 29/559 |

FOREIGN PATENT DOCUMENTS

| | | |
|---|---|---|
| GB | 2166070 A | 4/1986 |
| WO | 03068457 A1 | 8/2003 |

OTHER PUBLICATIONS

Huntsman, Araldite Spec Sheet, two part epoxy, Oct. 2011, 3 Pages.*
Jun. 13, 2014 Search Report issued in United Kingdom Patent Application No. 1318694.5.
Feb. 20, 2015 Search Report issued in European Application No. 14186584.

* cited by examiner

METHOD AND APPARATUS FOR SUPPORTING BLADES

TECHNICAL FIELD OF INVENTION

The present invention relates to methods of supporting blades mounted to a rotor disc, drum or ring for machining. The invention particularly relates to methods of temporarily supporting the aerofoils and preferably aerofoils integrally formed on the disc, drum or ring.

BACKGROUND OF INVENTION

With reference to FIG. 1, a ducted fan gas turbine engine generally indicated at 10 comprises, in axial flow series, an air intake 1, a propulsive fan 2, an intermediate pressure compressor 3, a high pressure compressor 4, combustion equipment 5, a high pressure turbine 6, an intermediate pressure turbine 7, a low pressure turbine 8 and an exhaust nozzle 9.

Air B entering the air intake 1 is accelerated by the fan 2 to produce two air flows, a first air flow into the intermediate pressure compressor 3 and a second air flow that passes over the outer surface of the engine casing 12 and which provides propulsive thrust. The intermediate pressure compressor 3 compresses the air flow directed into it before delivering the air to the high pressure compressor 4 where further compression takes place.

Compressed air exhausted from the high pressure compressor 4 is directed into the combustion equipment 5, where it is mixed with fuel that is injected from a fuel injector 14 and the mixture combusted. The resultant hot combustion products expand through and thereby drive the high 6, intermediate 7 and low pressure 8 turbines before being exhausted through the nozzle 9 to provide additional propulsive thrust. The high, intermediate and low pressure turbines respectively drive the high and intermediate pressure compressors and the fan by suitable interconnecting shafts.

The fan, compressor and turbine sections have alternating, axially spaced arrays of rotatable blades and static vanes. The rotatable blades are mounted to a disc, drum or ring either through attachment features, where a shaped element is secured in a complementary feature, or integrally, where the blade is formed with, or integrally joined to, the disc, drum or ring. For convenience in the rest of the specification, the description and claims will refer to a disc but this term should be considered to extend to drums and rings. The term "integrally bladed rotor," or IBR, should also be considered to extend to integrally bladed drums, integrally bladed discs and integrally bladed rings.

Integrally bladed rotors are rotors having integrally formed, or attached blades extending radially outwards from their circumference. The integrally bladed rotors are lighter than a similar component with detachable blades and offer superior airflow, tolerance and strength characteristics. Despite these advantages, IBRs are not routinely used because damage to one blade could result in the entire rotor being scrapped.

Processes to rebuild or repair IBRs are now being developed but the processes leave a surface finish that is not optimum. It is therefore necessary to finish machine the surfaces to restore to an appropriate surface finish. Given that the aerofoils of the IBR are cantilevered, any machining operation can be susceptible to vibration/chatter that also affects the final surface of the component. Due to the relatively narrow gap between blades, and due to the need to have full 360 degree access to the blade, conventional fixturing methods cannot be used to support the blade during the machining process.

It is an object of the present invention to seek to provide an improved method of supporting an aerofoil during machining.

STATEMENTS OF INVENTION

According to a first aspect of the invention, there is a provided a method of supporting a cantilevered component mounted to a hub, the method comprising the step of locating a cassette in proximity to the cantilevered component, the cassette defining a volume for filling with an encapsulant; filling the volume with an encapsulant material; and causing the encapsulant to solidify to the cantilevered component to support the cantilevered component.

The invention may further provide a method of supporting a blade mounted on a hub, the method comprising the step of locating a cassette in proximity to a blade mounted on a hub, the cassette defining a volume for filling with an encapsulant; filling the volume with an encapsulant material; and causing the encapsulant to solidify to the blade to support the blade on the hub.

Preferably the cassette has walls extending in a direction away from the hub, a bottom facing the hub and a top facing away from the hub, the method comprising placing the cassette in proximity to the blade and filling the volume with encapsulant through the top of the cassette.

The cassette may be placed to surround the blade. Alternatively, the cassette is placed in proximity to the blade and the blade forms one wall of the cassette. A sealant may be applied, or a flexible seal otherwise fixed, between the blade and the other walls of the cassette.

Preferably the method comprises providing a sheet between the hub and the cassette for separating the hub from the volume. The sheet may comprise one or more openings, the method comprising inserting a blade through a respective opening.

The sheet may have a plurality of alignment features and the cassette has a plurality of complementary alignment features, the method comprising aligning the cassette to the hub by engaging the alignment features with the complementary alignment features.

The cassette may be removed after the encapsulant is solidified. Alternatively, the cassette may be used to further stiffen the blade during machining.

Preferably the volume is filled with a liquid encapsulant that may be solidified by cooling, by applying energy to cure the encapsulant or by reaction with a chemical initiator.

The volume may be filled with a particulate encapsulant that is heated and cooled to solidify the encapsulant to the blade to support the blade on the hub. The heating and cooling may sinters the particulate encapsulant.

The cassette comprises integral heating or cooling elements. The integral heating elements preferably selected from the group comprising: resistive heating wires or conduits configured to carry a heating or cooling fluid.

Following support of the blade with the solidified encapsulant, the blade may be machined in a machining step. Preferably the blade is machined in the machining step whilst the blade is supported by the solid encapsulant. Additionally, whilst the machining step machines the blade at least a portion of the solidified encapsulant may be removed and preferably further removing at least a portion of the cassette.

The blade or cantilevered component may be supported in order to change its vibration response, or to damp vibrations. The blade or cantilevered component is preferably integrally formed with its respective hub.

DETAILED DESCRIPTION OF INVENTION

Figure 1:
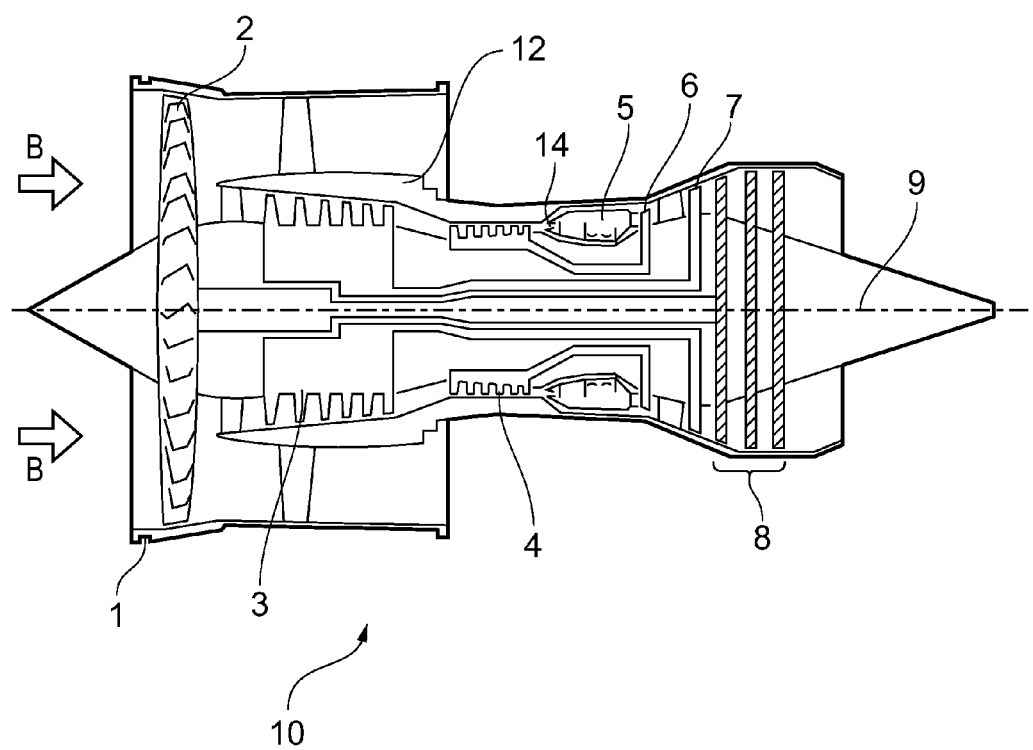
FIG. 1 depicts a gas turbine engine incorporating a rotor for supporting in accordance with the present invention.
Figure 2:
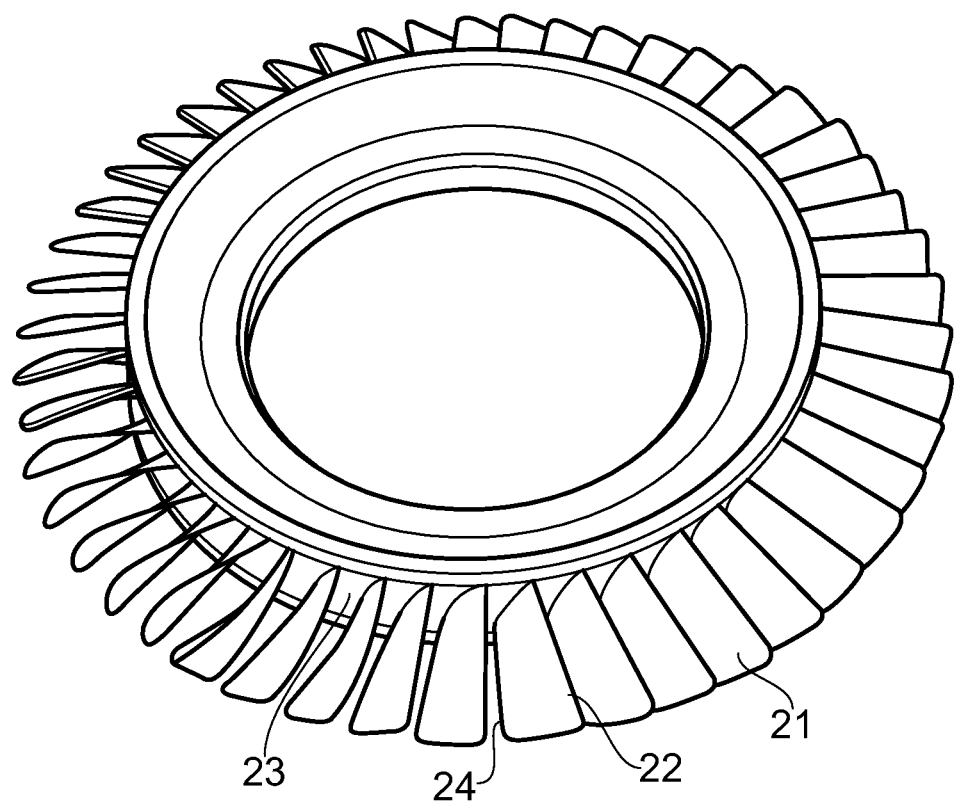
FIG. 2 depicts an integrally bladed rotor for supporting in accordance with the present invention.

FIG. 2 shows an enlarged view of a one-piece compressor rotor arrangement including an annular base body and several circumferentially distributed blade or aerofoil elements 21 extending essentially radially from the base body. The one-piece component removes the need for blade roots and disc slots and allows the blades to be spaced closer together.

If one of the blades is damaged either during manufacture or in use it is necessary to either remove and replace the blade or repair it in situ. Replacement of the blade involves cutting through the blade to leave a stub and subsequently welding a new blade onto the stub. Repair of the blade typically involves removing a portion of the blade or aerofoil to leave a notch, reforming a new portion as a patch either by direct replacement or by build up welding within the notch and then machining the patch to the desired profile.

Access to the aerofoil to machine the surface is difficult due to the proximity of adjacent blades and it is difficult to support the blade in addition to allow access of the machine tool.

A support is applied to the blades to temporarily increase their stiffness and change their vibration characteristics in order to reduce chatter of the aerofoil that can, in severe instances, damage the aerofoil but is more likely to affect the uniformity of the machined finish.

The support can be an encapsulant material that is applied to the blade either in solid or liquid form and subsequently caused to solidify to the aerofoil.

Figure 3:
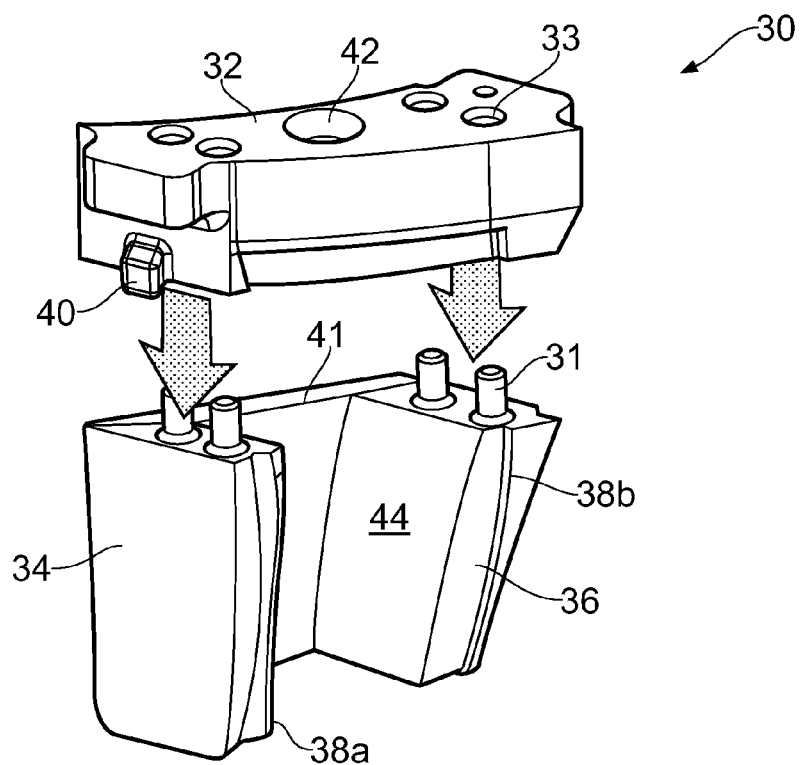
FIGS. 3 to 5 depict a cassette in accordance with a first embodiment of the invention.

FIG. 3 depicts a first embodiment of a cassette 30 used to apply an encapsulant to a blade. The cassette is arranged to provide encapsulant to one side of the blade only and to leave the opposite side available for direct access to a machine tool. In some circumstances it is desirable to encapsulate both sides of the aerofoil which requires using a complementary cassette to subsequently apply encapsulant to the opposite side of the aerofoil.

The cassette 30 has a top plate 32, side plates 34, 36 and an edge plate 41. The side plates 34, 36 have seals along their edges 38a, 38b that are shaped to align and seal with the leading 22 and trailing edges 24 of the aerofoil. Each of the side walls has mechanical joining features—pegs 31 in this embodiment—that mount within appropriately sized receptacles 33 in the top plate 32.

To assemble the cassette the side wall pegs are inserted into the receptacles in the top plate and secured with a clip 40, screws or other mechanical method. The edge plate 40 is mounted and joined to the side and top plates using an easily removable adhesive bead. It is desirable for the form of the edge plate 40 to match that of the opposite surface of the aerofoil, as will be described later, but it will be appreciated that this is not essential. It will also be appreciated that one or more of the side plates 34, 36 and/or the top plate 32 and or the edge plate 40 could be formed integrally. In an integrally formed arrangement the shuttering is a single piece component that is "n"-shaped with a hole in the top, and draft angles inside. Where multiple plates are integrally formed the cassette shape could be formed by folding the plates into the required shape using integrated hinges or live joints.

Figure 4:
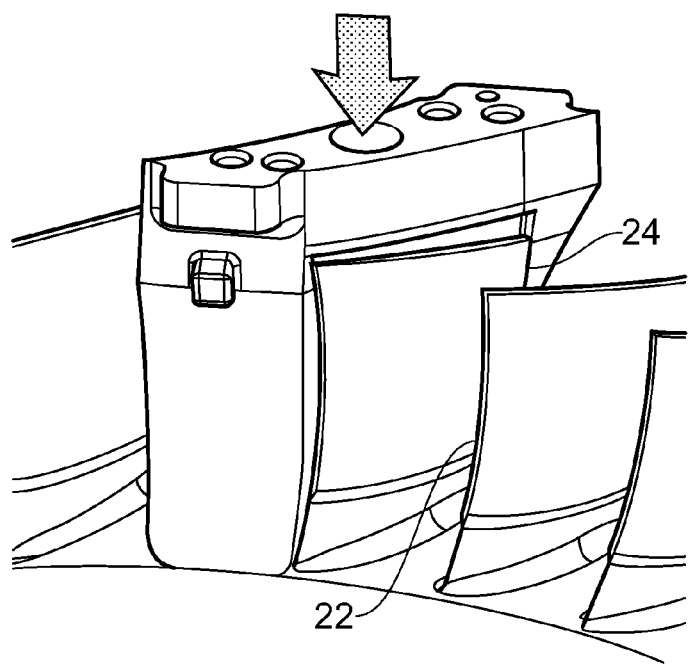

Once the cassette is assembled with side and top plates it is presented to the repaired blade and joined to the blade using a hot melt, low tack, adhesive between the edges 38a, 38b and the leading and trailing edges of the blade. This seals the cassette to form a substantially fluid tight volume 44 as shown in FIG. 4. As discussed earlier seals may be integrally formed to one or more of the side or edge plates.

The dimensions of each of the sides, top or edges of the cassette will depend on the blade to which the cassette is intended to be secured. The width of the sides should preferably be less than half the spacing between adjacent blades and more preferably a quarter or less. As an example, a blade spacing of 40 mm may have a cassette that extends about 8 mm from the blade surface.

The top plate has an aperture 42 that opens to the volume 44 that permits an encapsulant to be deposited within the volume. The encapsulant is preferably in liquid form as it is deposited within the volume, but a solid particulate that is subsequently caused to provide an appropriate encapsulant functionality could be used. In this embodiment the encapsulant is a liquefied wax, but could be a heated hot-melt adhesive, polymer resin (eg epoxy, with the aid of a release agent) or a heated low-melt alloy. The liquid may contain suspended particles.

The encapsulant is allowed to solidify either by cooling, imparting energy to induce a phase change, e.g. by applying UV light in the case of a UV curable encapsulant, or by chemical reaction where an initiator is applied e.g. where the encapsulant is a 2-part adhesive such as an epoxy. Once solidified the cassette can be removed.

First the sealant around the leading and trailing edges of the blade is removed. Often this achieved by simple peeling (with or without heating) but other techniques such as dissolving could also be used.

Figure 5:
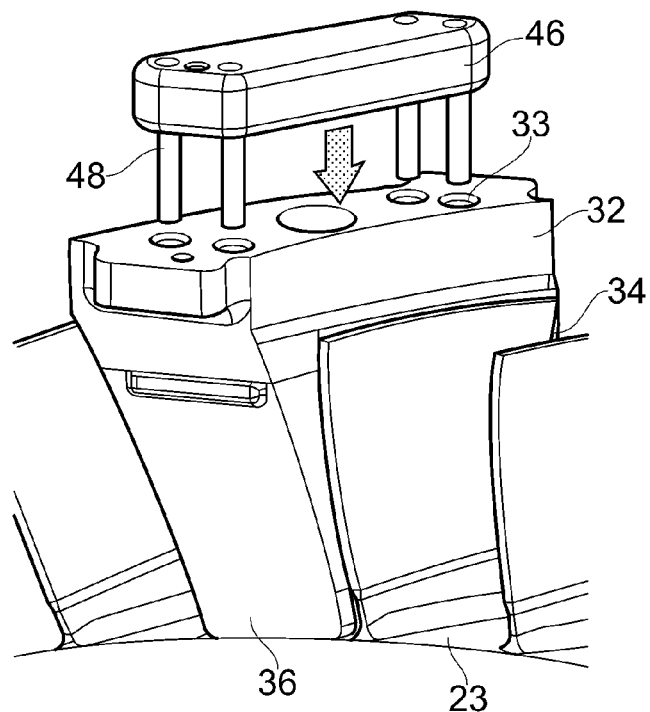
Figure 6:
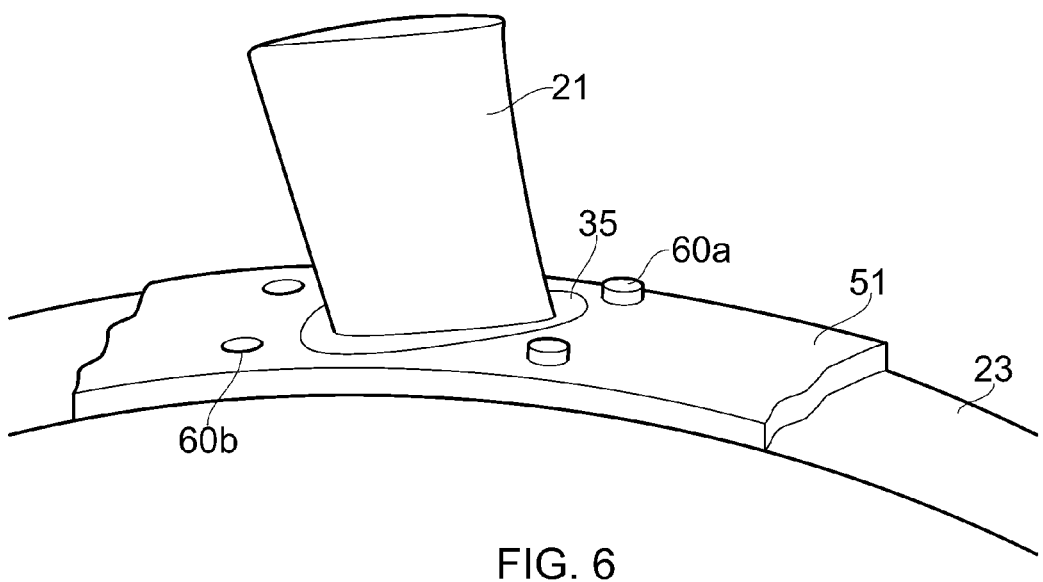
FIG. 6 depicts a protective sheet for positioning between the hub and the cassette of FIGS. 2-5

With reference to FIG. 5, the top plate is removed from the side walls using an extraction tool 46. The tool has pins 48 that engage the apertures 33 in the top plate and push against the top of the pegs 31 to dislodge the top plate 32 and break any adhesive connection between the solidified encapsulant and the top plate.

Once the top plate is removed the sides walls 34, 36 can be removed and the edge plate 41 to leave the solidified encapsulant behind. It will be appreciated that the volume of encapsulant applied can be carefully controlled by the dimensions of the cassette volume 44 and the amount of encapsulant added. With further control over the encapsulant used the vibration response of each repaired blade to be machined can be tailored.

It is desirable to keep the thickness of the encapsulant relatively low to avoid it pulling away from the sides of the blade or generating other problems. The thickness of the encapsulant depends in part on the type of encapsulant that is used. For example, if epoxy is in a thickness over 5 mm there is a risk that it could self-ignite due to heat generate by the chemical reaction. Furthermore, a smaller thickness, between 0.1 and 1 mm provides a high strength bond because of the lower shear forces that are generated.

Waxes shrink a great deal, often between 5-7% by volume, on solidification, and benefit from a lower thickness. The size of the thickness also depends on the viscosity of the material that can limit the flowability of the encapsulant and thus the minimum thickness. It has been found that the minimum optimum thickness for waxes is around 5 mm and largest optimum thickness around 20 mm.

Low melt allows benefit from a larger thickness as they expand very slightly on solidification. Thus the amount of expansion is dependent on the amount of material and can improve the amount of force exerted by the encapsulant on the blade surface.

The required thickness can be adjusted by suspending particles in the encapsulant.

If it is desired to encapsulate the opposite side of the aerofoil too, then the steps can be repeated using a new cassette, or by the same cassette but using the side which originally supported the edge plate 41. For this arrangement, a new edge plate will be required that corresponds to the side of the aerofoil previously encapsulated in order for it to seal against the seals on the sides 38a, 38b.

It may be necessary to protect the hub 23 from the applied encapsulant. This can be easily and cheaply achieved through the use of a barrier that extends around the portion of the rotor circumference to be protected and with sufficient apertures for the blades to extend through. The apertures are slightly oversized to allow for easy location.

The barrier is preferably formed of a plastics material but other materials such as rubber or silicone may be used as appropriate. As described later with respect to the second embodiment of the invention, the barrier may be formed with locating features that help to locate the cassette in the correct orientation, although one of the advantages of this first embodiment is that the cassette may be conveniently located with exact reference to the blade.

The cassette may be formed of a low wetting, or non-stick material, or may have a non-stick material applied to its inner surfaces to facilitate removal of the cassette from the encapsulant. The cassette may be formed of a thermally insulating material such as plastic in order to retain heat and slow the cooling of the encapsulant if cooling is required to solidify the encapsulant. Further thermal control of the cooling rate may be achieved by locating heating or cooling means, e.g. fluid channels, heating elements, etc. within the walls. The cassette may be formed of a UV transparent material so that a UV energy source may be located outside the cassette to facilitate solidification of the encapsulant if it is UV curable material. The cassette could be formed of a thermally conductive material to facilitate heat transfer from the encapsulant and speed up the cooling rate.

The walls and top and edge may be integral and a sacrificial item which remains attached to the blade through the encapsulant. Permanent rubber seals 38a, 38b may be used to reduce set up time.

Figure 7:
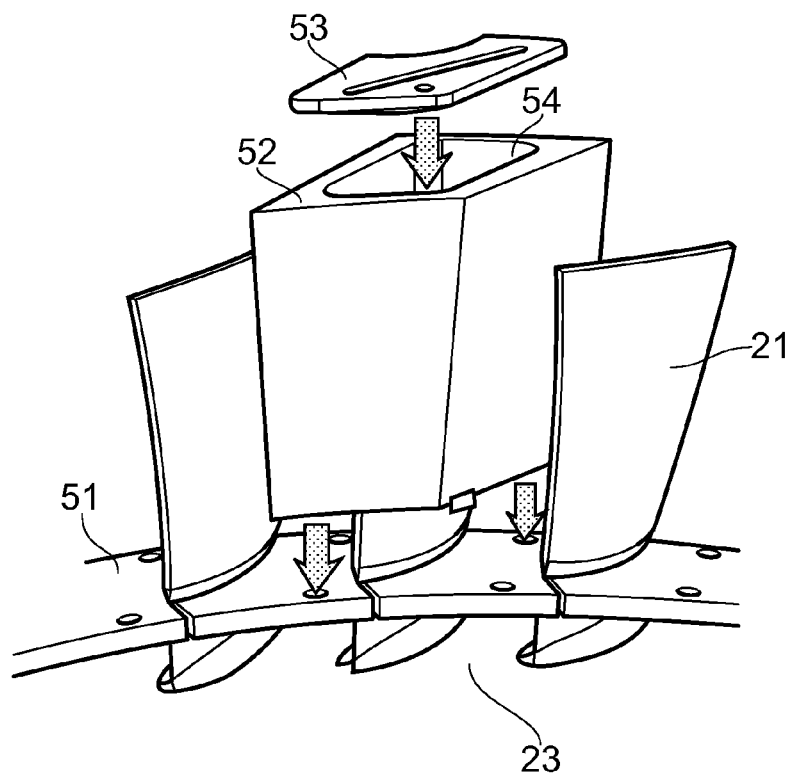
FIGS. 7 and 8 depict a cassette in accordance with a second embodiment of the invention.
Figure 8:
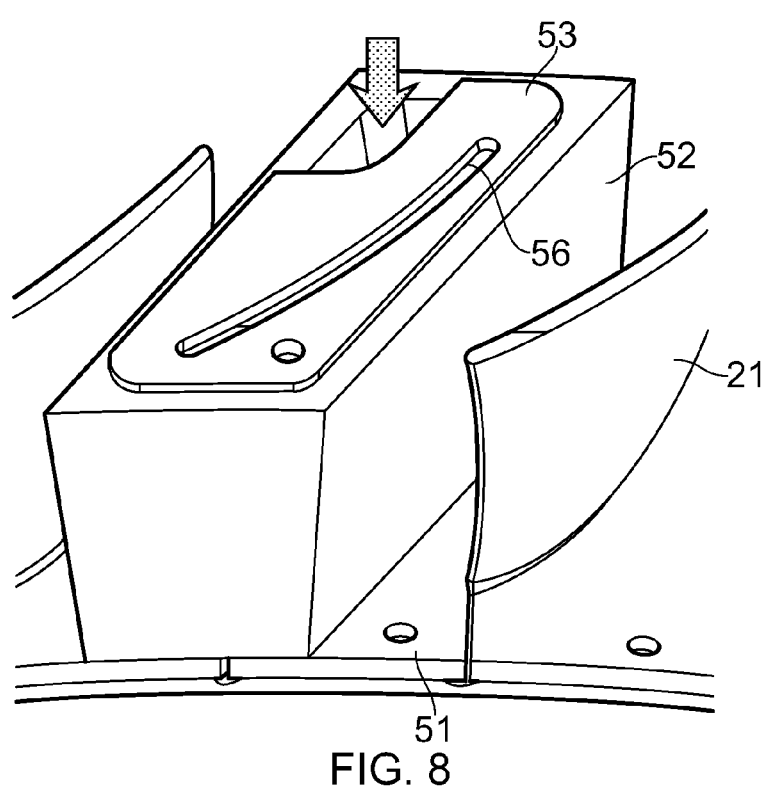

In a second embodiment of the invention the cassette is in the form of a sleeve, or cup 52 that has a periphery that encloses a volume 54 which surrounds the blade as shown in FIGS. 7 and 8.

The cup does not specifically reference any surface of the blade and it is therefore difficult to ensure that it is accurately located. A thin barrier 51 is placed over the hub 23 and has oversize apertures 35 through which the blades project. The barrier has a number of small protrusions 60a in a known position relative to the aperture and can be used as locating features into apertures in the cup arranged in a complementary fashion. Although one protrusion will give some locating functionality it is more preferable that two and preferably three or more locating features are used. The locating features may also be holes 60b into which protrusions on the cup engage in a complementary fashion.

The cup has a continuous periphery and a lower opening sized to receive a blade. The underside of the periphery has apertures or protrusions for locating features to engage with the locating features on the rotor barrier. By locating the cup using the locating features the general position of the cup relative to the blade is quickly and simply secured.

The cup, which preferably has an open top surface can be fitted with a location plate 53 which has an opening 56 that engages the top of the blade and a cut-out that gives an opening through which the encapsulant material may be supplied into the cup volume. A feature or step on the surface of the location plate facing the cup locates the location plate onto the cup and therefore the cup relative to the blade.

Once the cup is in place the volume surrounding the blade is filled with the encapsulant material such as an adhesive, such as epoxy, polyurethane or methacrylate, a wax or a low melt alloy and left till the encapsulant solidifies. As with regard to the first embodiment, the encapsulant is preferably in liquid form as it is deposited within the volume, but a solid particulate that is subsequently caused to provide an appropriate encapsulant functionality could be used. In this embodiment the encapsulant is a liquefied wax, but could be a heated hot-melt adhesive, or a heated low-melt alloy. The liquid may contain suspended particles.

The encapsulant is allowed to solidify either by cooling, imparting energy to induce a phase change, e.g. by applying UV light in the case of a UV curable encapsulant, or by chemical reaction where an initiator is applied, e.g. where the encapsulant is a 2-part adhesive such as an epoxy.

With an appropriate finish on the inside of the cup or sleeve the sleeve can be removed leaving the encapsulant surrounding the blade. Alternatively, in a more complex arrangement, the sleeve could be hinged along each edge and secured as a box by a clip on one side that engages with a latch on another side, clip and latch being releasable to allow the sleeve to expand and allow simple removal.

In a more preferred arrangement, however, the cup is a low cost, expendable component formed of a material that can be quickly and easily machined away without damaging the blade. A machine moulded plastic material is particularly preferred.

Figure 9:
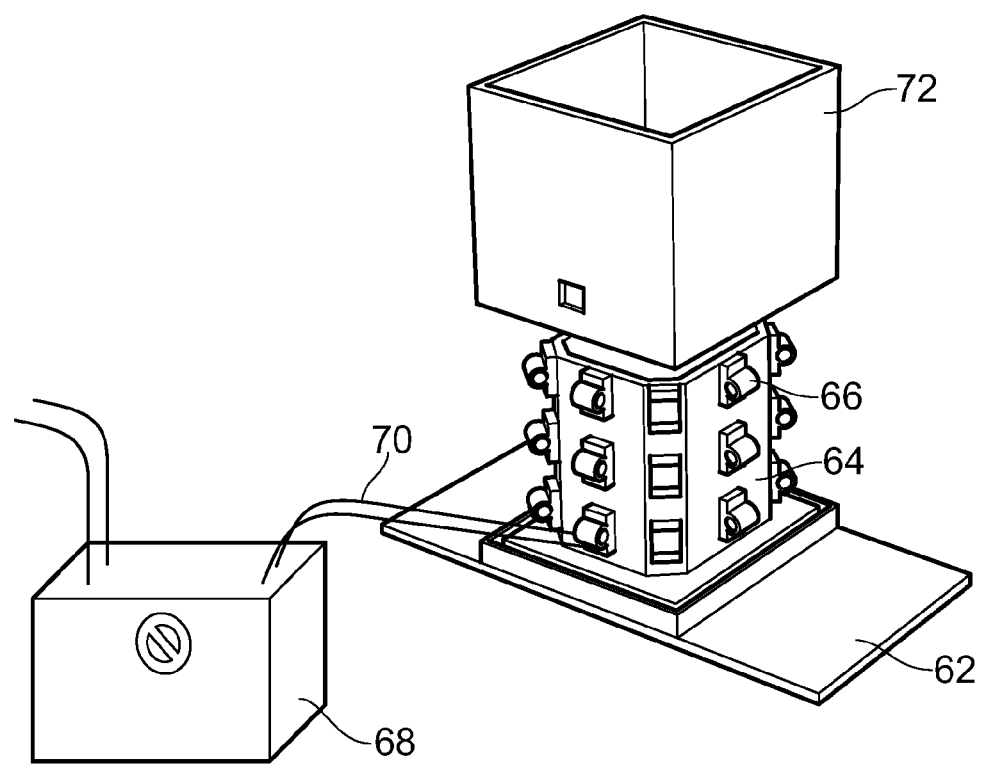
FIG. 9 depicts a cassette in accordance with a third embodiment of the invention

In a further embodiment the encapsulant, which is a powder that is to be sintered around the blade, uses a cup or sleeve provided an additional heating element and depicted in FIG. 9. As in the previous embodiments, a sheet 62 is placed over the hub to electrically isolate it from the cup, mechanically protecting the disc whilst also being able to provide locating features as described above. Because the encapsulant is preferably heated electrically, the sheet 62 can easily provide any necessary electrical isolation between the cup and the disc surface.

The cup or sleeve 64 is preferably metallic, steel, copper or aluminum are particularly preferred, and a number of heating elements are located around its circumference. In the embodiment of FIG. 9, the cup 64 has a plurality of guide features 66 through which a heating element, e.g. a nichrome wire, can be threaded. The guides 66 preferably act as an insulator between the wire and the sleeve and are preferably a ceramic material that can accommodate high wire temperatures without melting.

The electrical heating element 70 is connected to a transformer 68 that supplies the necessary current. The cup is placed over the blade to be repaired and filled with the plastics powder, or other low melt granular material. An insulation cap 72, preferably of ceramic, is placed over the cup 64. The insulation cap 72 prevents excessive heat loss from the heating elements, or short circuits, that may be a health and safety hazard or risk damage to adjacent blades or equipment.

Sufficient power is supplied to the heating elements to generate sufficient heat that cause the powder to melt such that on cooling, the particles fuse together to form a solid reinforcement around the blade. The melting of the particles may not need to be complete, i.e. it may be sufficient to simply sinter the particles. However, full melting of the particles into liquid form may be required in some circumstances.

Once cooled or solidified the insulation cap and metallic cup are removed to leave the encapsulated blade.

Once the blade is fully supported either by the encapsulant alone, or where the cup is intended to remain in situ with the encapsulant, it is possible to machine the blade such that the blade machining generates reduced chatter or vibration. Describing first the embodiments where the blades is supported solely by the encapsulant.

The machining operation takes places through the support, destroying the support where it interfaces to the blade. The blade can be machined on a 5-axis milling machine, and as the blade surface resides under the support, the tool cuts straight through this, swarfing the encapsulant. Possible additional machining operations could be used to give increased cutter clearance or reduce cutting load. The general intention is to give the blade to be machined as much support as possible, only removing excess material when absolutely necessary. When machining is completed any remains of the structure can be removed. The milling process is the most suitable for this type of operation.

The machining may also sequentially remove portions of the encapsulant and the cup to expose portions of the blade that is subsequently machined either in the same or a different machining process. The cup and encapsulant may be removed in multiple steps to expose an increasingly larger portion of the aerofoil. The portions exposed can be selected in an order that minimises chatter or vibration. The final machining operation on the repaired blade cuts away the remaining cup and encapsulant leaving behind just the finished blade.

It will be appreciated that the invention has been described primarily with respect to integrally bladed rotors but that it will find application in rotors with removable blades and aerofoils where it is desired that the blade or aerofoil remains attached to the disc during machining.

The arrangement could also be used for applications other than aerospace, for example ship or submarine propellers, heat exchanger fins, or elsewhere a cantilevered device may require temporary support during machining.

Traditional mechanical fixtures can be very expensive to design, manufacture and maintain. Advantageously, the fixturing systems proposed herein are relatively cheap and simple to manufacture.

Because the encapsulant takes up surface imperfections, the methods proposed herein are well suited to fixturing friction welded bladed discs that are assembled from forgings since these generally have a less predictable blade profile before machining.

The process and equipment used in the repair can be standardized as the same basic equipment and process can be used for virtually any blade.

As a traditional mechanical fixture requires a fixed clamping position to hold the blade this can obstruct the machining operation. As the encapsulant is machined away as part of the machining process the likelihood of obstructing the tool access is eliminated.

The cups, sleeves or other fixturing devices can be formed using a 3D printer that allows designs suitable for legacy or development blades. The data can be stored digitally and recalled as needed. The cups, sleeves or other fixtures may be manufactured based on data taken from the repaired blade. The space between the blade and the cup can be kept small which can reduce the risk of the encapsulant coming away from the blade caused by shrinkage and which can be a problem if sufficient encapsulant is applied to extend entirely between adjacent blades.

As each blade is separately braced, or at most braced with an adjacent blade, the bracing can be applied to all the repaired blades of the bladed disc in a separate process that allows blades to be machined sequentially once the bladed disc is mounted to the machining fixture. The bracing is low profile which can allow the bladed disc to rotate without having to remove it from the machining fixture.

It will be appreciated that a number of different embodiments are described and the skilled person will appreciate that features of each embodiment could be combined with features of one or more of the other embodiments as appropriate or as required without departing from the invention described herein.

The invention claimed is:

1. A method of supporting a blade mounted on a hub, the method comprising:
    locating a cassette in proximity to the blade mounted on the hub, the cassette having a plurality of complementary alignment features and defining a volume for filling with an encapsulant material;
    filling the volume with the encapsulant material;
    solidifying the encapsulant material within the volume to support the blade on the hub;
    providing a sheet between the hub and the cassette for separating the hub from the volume, the sheet having a plurality of alignment features; and
    aligning the cassette to the hub by engaging the alignment features of the sheet with the complementary alignment features of the cassette.

2. The method according to claim 1, wherein the cassette is placed to surround the blade.

3. The method according to claim 1, wherein:
    the sheet comprises one or more openings; and
    the method further comprises inserting a blade through a respective opening.

4. The method according to claim 1, wherein the cassette is removed after the encapsulant material is solidified.

5. The method according to claim 1, wherein the volume is filled with a liquid encapsulant that is solidified by cooling.

6. The method according to claim 1, wherein the volume is filled with a liquid encapsulant that is solidified by applying energy to cure the liquid encapsulant.

7. The method according to claim 1, wherein the volume is filled with a liquid encapsulant that is solidified by reaction with a chemical initiator.

8. The method according to claim 1, wherein:
the cassette includes: (i) walls extending in a direction away from the hub, (ii) a bottom facing the hub, and (iii) a top facing away from the hub; and
the method further comprises placing the cassette in proximity to the blade and filling the volume with the encapsulant material through the top of the cassette.

9. The method according to claim 8, wherein the cassette is placed in proximity to the blade, such that the blade forms one wall of the cassette.

10. The method according to claim 1, wherein the volume is filled with a particulate encapsulant that is heated and cooled to solidify the particulate encapsulant to the blade to support the blade on the hub.

11. The method according to claim 10, wherein the heating and cooling sinters the particulate encapsulant.

12. The method according to claim 1, wherein the cassette comprises integral heating or cooling elements.

13. The method according to claim 12, wherein the integral heating elements are selected from a group including resistive heating wires or conduits configured to carry a heating or cooling fluid.

14. The method according to claim 1, wherein the blade is machined in a machining step following supporting the blade with the solidified encapsulant material.

15. The method according to claim 14, wherein the blade is machined in the machining step whilst the blade is supported by the solidified encapsulant material.

16. The method according to claim 15, wherein the machining step machines the blade and removes at least a portion of the solidified encapsulant material.

17. The method according to claim 16, wherein the machining step further removes at least a portion of the cassette.

* * * * *